United States Patent
Ho et al.

(10) Patent No.: US 8,653,841 B2
(45) Date of Patent: Feb. 18, 2014

(54) METHOD AND APPARATUS FOR MONITORING A HIGH-VOLTAGE ELECTRICAL CIRCUIT INCLUDING A DISCHARGE CIRCUIT

(75) Inventors: Li-Pen J. Ho, Farmington Hills, MI (US); David P. Tasky, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 13/464,128

(22) Filed: May 4, 2012

(65) Prior Publication Data

US 2013/0293248 A1     Nov. 7, 2013

(51) Int. Cl.
    *G01R 31/00*     (2006.01)
(52) U.S. Cl.
    USPC ...... 324/750.01; 324/376; 324/509; 324/523; 324/525; 324/536; 318/376; 318/800
(58) Field of Classification Search
    USPC ............ 324/750.01, 509, 523, 525, 536, 376; 318/376, 800
    See application file for complete search history.

(56) References Cited

U.S. PATENT DOCUMENTS

| | | | | |
|---|---|---|---|---|
| 6,563,268 B2 * | 5/2003 | Yoshida et al. | | 315/73 |
| 7,049,825 B2 * | 5/2006 | Carruthers | | 324/509 |
| 7,135,835 B2 * | 11/2006 | Yamada et al. | | 318/800 |
| 7,645,206 B2 | 1/2010 | Holmes et al. | | |
| 7,764,067 B2 * | 7/2010 | Lindsey | | 324/519 |
| 8,415,906 B2 * | 4/2013 | Iwashita et al. | | 318/376 |
| 2008/0129308 A1 * | 6/2008 | Lindsey et al. | | 324/525 |
| 2012/0056567 A1 | 3/2012 | Savagian | | |

* cited by examiner

*Primary Examiner* — Arleen M Vazquez
*Assistant Examiner* — Giovanni Astacio-Oquendo

(57) ABSTRACT

A high-voltage discharge circuit diagnostic system includes a high voltage DC link with a positive DC link and a negative DC link, a first resistor selectably connectable between the positive DC link and the negative DC link, and a second resistor connected between the positive DC link and the negative DC link. A control module connects the first resistor between the positive DC link and the negative DC link until the high voltage DC link discharges to a first voltage after which the control module disconnects the first resistor from between the positive DC link and the negative DC link to permit continued discharge of the high voltage DC link through the second resistor to a second voltage through an elapsed time period. The control module diagnoses a fault in the second resistor based upon the first voltage, the second voltage, and the elapsed time period.

11 Claims, 3 Drawing Sheets

METHOD AND APPARATUS FOR MONITORING A HIGH-VOLTAGE ELECTRICAL CIRCUIT INCLUDING A DISCHARGE CIRCUIT

TECHNICAL FIELD

This disclosure is related to high-voltage electrical systems, including powertrain systems.

BACKGROUND

Known vehicle systems use hybrid powertrain architectures to generate at least a portion of required tractive torque originating from a non-hydrocarbon-fueled motor, including an electric machine that transforms electric power to mechanical torque. Powertrain architectures may be configured to transfer tractive torque to an output member through a transmission device. Such powertrain architectures can include series-hybrid configurations, parallel-hybrid configurations, and compound-split hybrid configurations. Electric machines operative as both motors and generators can be controlled to generate torque inputs to the transmission independently of a torque input from the internal combustion engine. The electric machines may react and transform vehicle kinetic energy transmitted through the vehicle driveline to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange among the electrical energy storage device and the electric machines to manage torque and rotational speed outputs of the transmission.

Known electrical circuits for providing electric power to electric machines include a high-voltage DC electrical energy storage device that supplies DC electric power via a high-voltage bus through a DC link to an inverter which transforms the DC electric power to AC electric power to power the electric machine. The electric machine is preferably a multiphase synchronous AC machine including a stator and a rotor magnetically coupled to the stator.

SUMMARY

A high-voltage discharge circuit diagnostic system includes a high voltage DC link with a positive DC link and a negative DC link, a first resistor selectably connectable between the positive DC link and the negative DC link, and a second resistor connected between the positive DC link and the negative DC link. A control module connects the first resistor between the positive DC link and the negative DC link until the high voltage DC link discharges to a first voltage after which the control module disconnects the first resistor from between the positive DC link and the negative DC link to permit continued discharge of the high voltage DC link through the second resistor to a second voltage through an elapsed time period. The control module diagnoses a fault in the second resistor based upon the first voltage, the second voltage, and the elapsed time period.

BRIEF DESCRIPTION OF THE DRAWINGS

One or more embodiments will now be described, by way of example, with reference to the accompanying drawings, in which.

DETAILED DESCRIPTION

Figure 1:
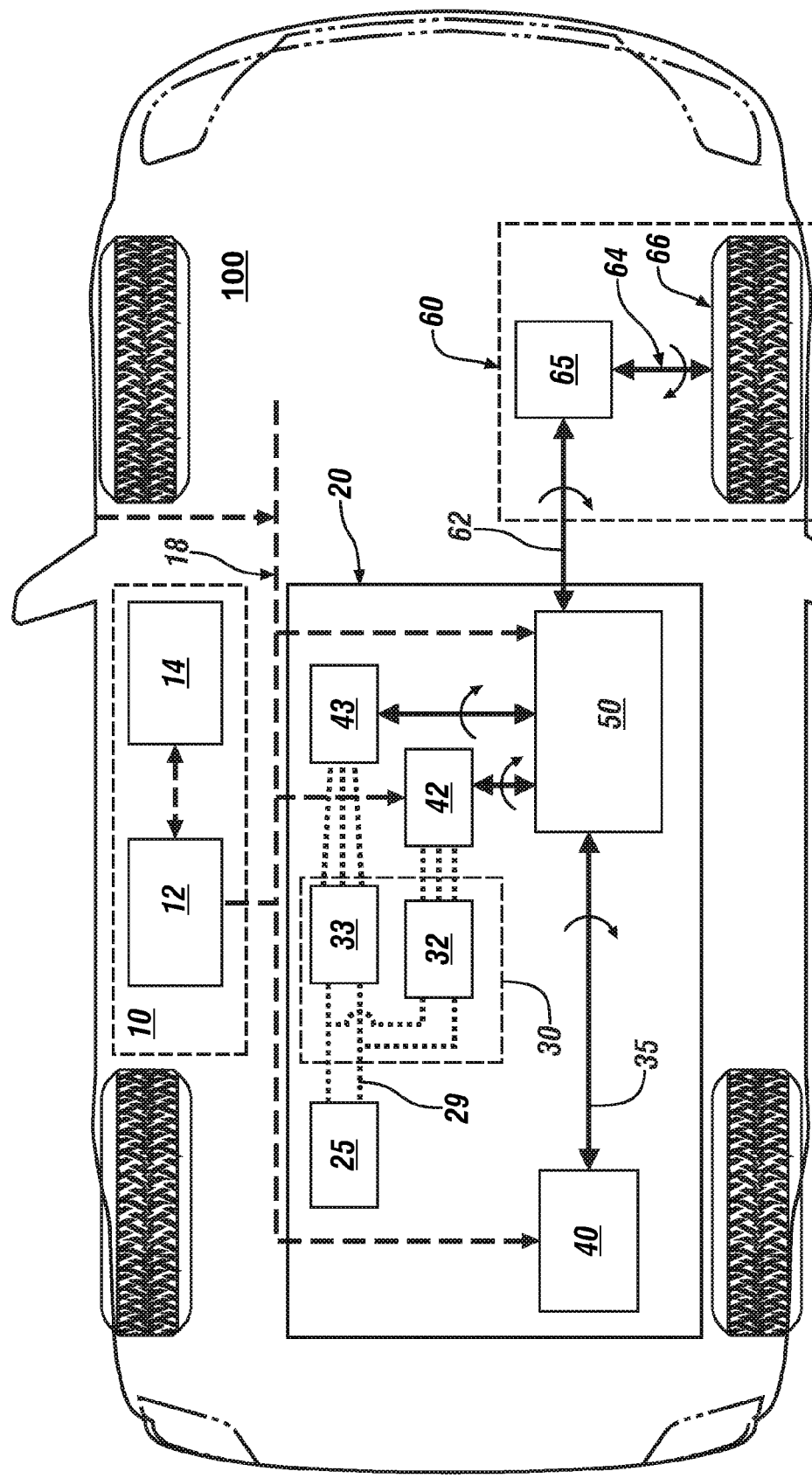
FIG. 1 illustrates a vehicle including a hybrid powertrain system having an engine, hybrid transmission, torque machine, and a driveline, in accordance with the present disclosure.

Referring now to the drawings, wherein the showings are for the purpose of illustrating certain exemplary embodiments only and not for the purpose of limiting the same, FIG. 1 schematically shows an exemplary vehicle 100 including a hybrid powertrain system 20 coupled to a driveline 60 and controlled by a control system 10. Like numerals refer to like elements throughout the description. The hybrid powertrain system 20 includes a mechanical power path that includes an engine 40 and first and second electrically-powered torque machines 42 and 43, respectively, that mechanically couple to a hybrid transmission 50 having an output member 62 that couples to the driveline 60. A high-voltage electrical circuit 30 electrically connects to a high-voltage battery 25 via a high-voltage bus 29. A high-voltage switch is preferably incorporated into either the high-voltage bus 29 or the high-voltage electrical circuit 30 to disconnect the high-voltage battery 25 from the high-voltage electrical circuit 30. In one embodiment, the high-voltage electrical circuit 30 includes first and second electric power inverters 32 and 33, respectively that electrically connect to the first and second torque machines 42 and 43, respectively.

The engine 40 may be any suitable internal combustion engine, and is preferably a multi-cylinder direct fuel injection internal combustion engine that converts fuel to mechanical power through a combustion process. The first and second torque machines 42 and 43 preferably include multi-phase electric motor/generators configured to convert stored electric energy to mechanical power when operating in a torque generating state and convert mechanical power to electric energy that can be stored in the high-voltage battery 25 when operating in an electric power generating state. The transmission 50 may be any suitable transmission device, and in one embodiment includes one or more differential gear sets and activatable clutch components to effect torque transfer over a range of speeds between the engine 40, the first and second torque machines 42 and 43, and an output member 62 coupled to a vehicle driveline 60. The driveline 60 includes a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the hybrid transmission 50 and a road surface. Mechanical power originating in the engine 40 may be transferred via an input member 33 to the first torque machine 42 and to the output member 62 via the hybrid transmission 50. Mechanical power originating in the first torque machine 42 may be transferred to the engine 40 via the input member 33 and to the output member 62 via the hybrid transmission 50. Mechanical power originating in the second torque machine 43 may be transferred via the hybrid transmission 50 to the output member 62. Mechanical power can be transferred between the hybrid transmission 50 and the driveline 60 via the output member 62. Other powertrain system configurations may be employed to similar effect.

The high-voltage battery 25 stores potential electric energy and is electrically connected via the high-voltage bus 29 to the high-voltage electrical circuit 30 that connects to the first and second torque machines 42 and 43 to transfer electric power therebetween. It is appreciated that the high-voltage battery 25 is an electric energy storage device that can include a plurality of electrical cells, ultracapacitors, and other devices configured to store electric energy on-vehicle. One exemplary high-voltage battery 25 includes a plurality of lithium-ion cells. Parametric states associated with the high-voltage battery 25 include a state-of-charge, temperature, available voltage, and available battery power, each of which is monitored by the control system 10.

The high-voltage electrical circuit 30 includes first and second inverters 32 and 33 that electrically connect to the first and second torque machines 42 and 43, respectively. The first and second torque machines 42 and 43 interact with the respective first and second inverters 32 and 33 to convert stored electric energy to mechanical power and convert mechanical power to electric energy that can be stored in the high-voltage battery 25. It is appreciated that the first and second electric power inverters 32 and 33 are operative to transform high voltage DC electric power to high-voltage AC electric power and also operative to transform high voltage AC electric power to high-voltage DC electric power. Electric power originating in the first torque machine 42 may be transferred electrically to the high-voltage battery 25 via the high-voltage electrical circuit 30 and the high-voltage bus 29 and to the second torque machine 43 via the high-voltage electrical circuit 30. Electric power originating in the second torque machine 43 may be transferred electrically to the high-voltage battery 25 via the high-voltage electrical circuit 30 and the high-voltage bus 29 and to the first torque machine 42 via the high-voltage electrical circuit 30. Additional details related to an exemplary high-voltage electrical circuit 30 are provided with reference to FIG. 2 and the associated description.

The control system 10 includes a control module 12 that is configured to control operation of the vehicle 100 including the hybrid powertrain system 20 in response to operator inputs detected via an operator interface 14. The control module 12 includes a low-voltage electric power supply to provide regulated electric power thereto. The operator interface 14 captures and conveys information from a plurality of human/machine interface devices through which the vehicle operator commands operation of the vehicle 100, including, e.g., an ignition switch to enable an operator to crank and start the engine 40, an accelerator pedal, a brake pedal, and a transmission range selector (PRNDL). Although the control module 12 and operator interface 14 are shown as individual discrete elements, such an illustration is for ease of description. It is appreciated that information transfer to and from the control module 12 can be accomplished using one or more communications paths, e.g., communications bus 18, which can include one or more of a direct connection, a local area network bus, and a serial peripheral interface bus.

The control module 12 signally and operatively connects to individual elements of the hybrid powertrain system 20 directly or via one or more communications buses, shown herein as communications bus 18. The control module 12 signally connects to the sensing devices of each of the high-voltage battery 25, the high-voltage bus 29, the first and second electric power inverters 32 and 33, the first and second torque machines 42 and 43, the engine 40, and the hybrid transmission 50 to monitor operation and determine parametric states thereof.

The control module 12 operatively connects to the actuators of the first and second inverters 32 and 33, the engine 40, and the hybrid transmission 50 to control operation thereof in accordance with executed control schemes that are stored in the form of control routines and calibrations. It is appreciated that each of the first and second inverters 32 and 33 transforms electric power in a manner suitable for generating torque with one or both the first and second torque machines 42 and 43, and transforms mechanical power in a manner suitable for generating electric power with one or both the first and second torque machines 42 and 43, depending upon torque inputs and operating conditions.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The control module 12 executes control schemes to control operation of the engine 40 in coordination with the first and second electric power inverters 32 and 33 to control overall operation of the hybrid powertrain system 20 to manage transfer of mechanical power to the driveline 60 and to manage electric power flow to the high-voltage battery 25. Such control schemes include balancing operation of the engine 40 with allowable battery power limits associated with the high-voltage battery 25 while achieving an output torque to the driveline 60 that is responsive to an operator torque request.

Figure 2:
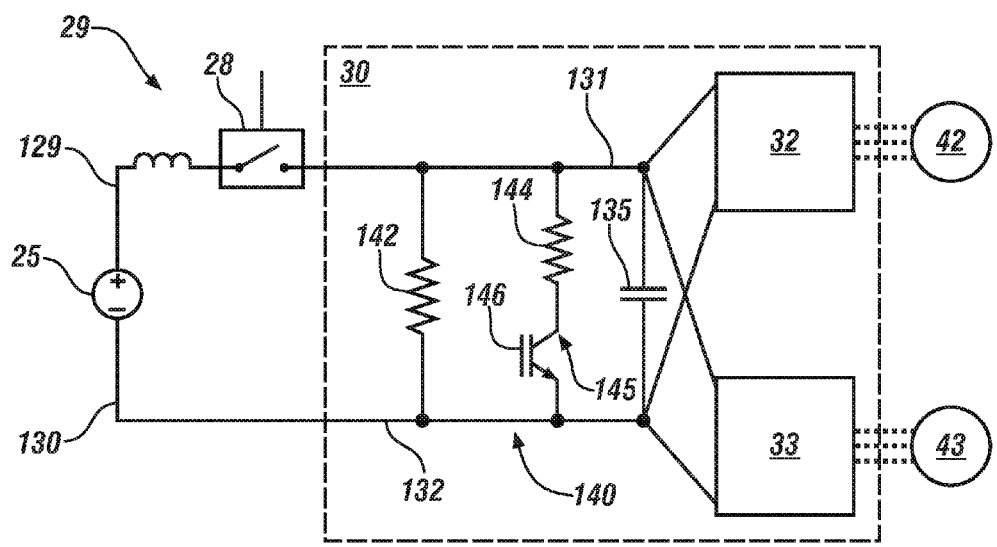
FIG. 2 illustrates an electric circuit of a hybrid powertrain system including a high-voltage battery connected to a high-voltage bus connected to high-voltage electrical circuit and first and second torque machines, in accordance with the present disclosure.

FIG. 2 schematically shows details of the high-voltage battery 25, the high-voltage bus 29 including a nominally positive side 129 and a nominally negative side 130, the high-voltage electrical circuit 30, and the first and second torque machines 42 and 43. The high-voltage electrical circuit 30 includes a DC link that includes a nominally positive DC link 131 and a nominally negative DC link 132 electrically coupled via the high-voltage bus 29 to the high-voltage battery 25. The voltage across the positive DC link 131 and the negative DC link 132 of the high-voltage electrical circuit 30 is equivalent to the voltage across the high-voltage electrical circuit 30 and the two may be referred to interchangeably. The nominally positive and nominally negative DC links 131 and 132 electrically couple the positive side 129 and the negative side 130, respectively, of the high-voltage bus 29 to both the first and second inverters 32 and 33. The high-voltage electrical circuit 30 thereby transfers electric power between the high-voltage battery 25 and at least one torque machine (e.g., first and/or second torque machines 42 and 43). Controllable high-voltage switch 28 is operatively coupled to the control module 10 and selectively couples and decouples the high-voltage bus to the high voltage electrical circuit 30. The high-voltage electrical circuit 30 further includes a high-voltage filter capacitor 135 and a discharge circuit 140 electrically coupled between the positive and negative DC links 131 and 132, respectively. The high-voltage filter capacitor 135 is coupled in parallel with the discharge circuit 140.

The discharge circuit 140 includes a passive discharge element 142 and an active discharge element 145. The active discharge element 145 includes a controllable discharge switch 146 coupled in series with a first resistor 144 that electrically connects between the positive and negative DC links 131 and 132. The controllable discharge switch 146 is preferably an IGBT or a MOSFET device that is operatively coupled to the control module 12. As will become apparent, the controllable discharge switch 146 electrically connects the positive and negative DC links 131 and 132 through first resistor 144 only when the controllable discharge switch 146 is activated (i.e. closed) to actively discharge the high-voltage DC link (i.e. discharging the positive DC link to the negative DC link). Further, deactivating the controllable discharge switch 146 (i.e. open switch 146) discontinues the active discharge of the high-voltage DC link. The passive discharge element 142 preferably includes a second resistor 142 electrically coupled between the positive and negative DC links 131 and 132. The passive discharge element 142 is coupled in parallel across the active discharge element 145. The second resistor 142 preferably has a resistance that is at least about two orders of magnitude greater than the resistance of the first resistor 144.

Figure 3:
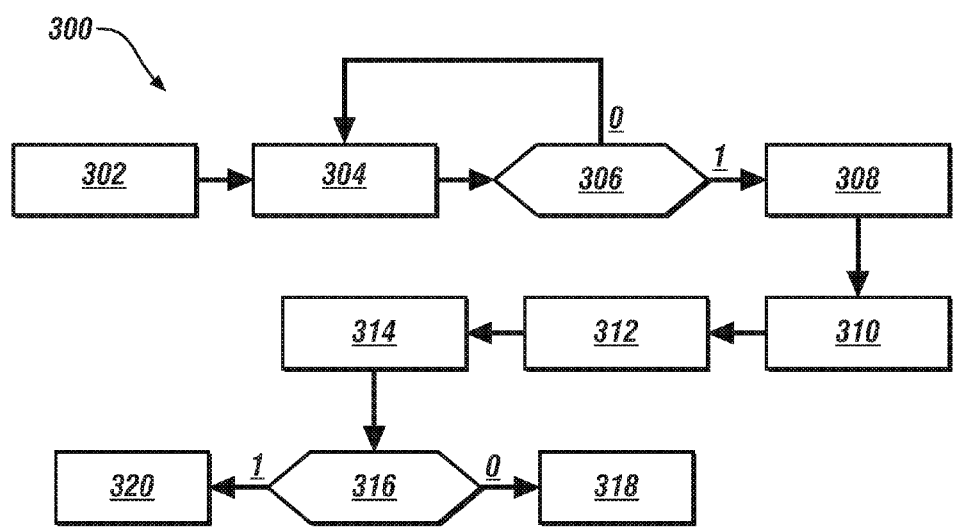
FIG. 3 illustrates a control scheme for controlling operation of a high-voltage electrical circuit for a hybrid powertrain, in accordance with the present disclosure.

FIG. 3 illustrates a control scheme 300 for detecting a fault in a passive discharge element of a discharge circuit for a high-voltage electric circuit, described with reference to FIG. 2. The control scheme 300 includes initially actively discharging the high-voltage electrical circuit 30, which may be initiated, for example, subsequent to an opening of the high-voltage switch 28 (i.e., decoupling of the high-voltage electrical circuit 30 from the high-voltage battery 25). Active discharge of the high-voltage electrical circuit 30 may be initiated in response to a vehicle key-off event. Active discharge of the high-voltage electrical circuit 30 may be initiated in response to detection of a system fault. Active discharge of the high-voltage electrical circuit 30 may be initiated in response to a motor vehicle crash.

The active discharge of the high-voltage electrical circuit 30 is discontinued when the voltage across the high-voltage DC link discharges to a target voltage through the first resistor 144. A first voltage across the high-voltage electrical circuit 30 is captured when the active discharge of the high-voltage electrical circuit is discontinued. A second voltage across the high-voltage electrical circuit 30 is captured subsequent to an elapsed time period during which the high-voltage electrical circuit 30 continues to discharge through the passive discharge element (second resistor) 142. Performance of the passive discharge element of the discharge circuit is evaluated, based upon the first voltage, the second voltage and the elapsed time period. Table 1 is provided as a key to FIG. 3 wherein the numerically labeled blocks and the corresponding functions are set forth as follows.

TABLE 1

| BLOCK | BLOCK CONTENTS |
| --- | --- |
| 302 | Initiate active discharge |
| 304 | Monitor voltage |
| 306 | Is voltage less than target voltage? |
| 308 | Discontinue active discharge |
| 310 | Record first voltage |
| 312 | Wait elapsed time period |
| 314 | Record second voltage; calculate voltage change |
| 316 | Is voltage change greater than threshold voltage change? |
| 318 | Indicate passive discharge circuit fault |
| 320 | Indicate passive discharge circuit pass |

The control scheme 300 for control and monitoring of the discharge circuit is initiated when there is a command to initiate active discharge of the high-voltage electrical circuit, which may be in response to a command to discharge the voltage across the high-voltage electrical circuit (302). Active discharge of the high-voltage electrical circuit is initiated by selectively activating the controllable discharge switch 146 of the active discharge element 145. System voltages are monitored, including monitoring voltage between the positive DC link 131 and the negative DC link 132 of the high-voltage electrical circuit (304). This voltage across the high-voltage electrical circuit 30 is ongoingly monitored and compared with a target voltage (306). The target voltage may be set at or near 60V DC in one embodiment.

When the voltage across the high-voltage electrical circuit 30 is less than the target voltage (1), the active discharge of the high-voltage electrical circuit is discontinued (308), and a first voltage between the positive DC link and the negative DC link of the high-voltage electrical circuit is immediately captured and recorded (310). The discontinued active discharge of the high-voltage electrical circuit includes selectively deactivating the controllable discharge switch 146 of the active discharge element 145, wherein the deactivated controllable discharge switch 146 electrically decouples the positive DC link from the negative DC link thus removing the discharge path of the high-voltage electrical circuit through the active discharge element 145, leaving the only discharge path through the passive discharge element 142. A predetermined elapsed time period is observed (312) after which a second voltage between the positive DC link and the negative DC link of the high-voltage electrical circuit is captured and recorded, and the voltage change between the first and second voltages is calculated (314). The voltage change between the first and second voltages and the predetermined elapsed time period may be used to calculate a time-rate discharge of the high-voltage electrical circuit through the passive discharge element 142.

In one embodiment, the voltage change between the first and second voltages is compared to a threshold voltage change (316). One of an absence (316)(1) and a presence (316)(0) of a fault can be detected in the passive discharge element 142 based on the comparison of the first voltage and the second voltage after the predetermined elapsed time period. The threshold voltage change is determined based upon a desired time-rate of discharge of the high-voltage electrical circuit through the passive discharge element 142. When the voltage change between the first and second voltages is at least the threshold voltage change (316)(1), it indicates that the electrical circuit is discharging through the passive discharge element 142 at least at the desired rate and thus the passive discharge circuit is functioning as desired (320). In other words, the absence of the fault in the passive discharge element is detected when the voltage change is at least the voltage change threshold. When the voltage change is less than the threshold voltage change (0), it indicates that the high-voltage electrical circuit is not discharging at the desired rate through the passive discharge element 142. Thus, the passive discharge circuit is not functioning as desired, indicating a fault (318). In other words, the presence of the fault in the passive discharge element 142 is detected when the voltage change is less than the voltage change threshold. When a fault associated with the passive discharge circuit is indicated, the information is communicated to the vehicle operator.

Alternatively, diagnosis may be made through determination of a time-rate discharge of the high-voltage electrical circuit and comparison to a threshold time-rate discharge. The time-rate discharge of the high-voltage electrical circuit may be determined using the aforementioned voltage change between the first and second voltages over the elapsed time period wherein the elapsed time period is predetermined. Alternatively, the time-rate discharge of the high-voltage electrical circuit may be determined using the voltage change between the first and second voltages over the elapsed time period wherein the second voltage is predetermined. The presence of the fault in the passive discharge element 142 can be detected when the time-rate discharge of the high-voltage electrical circuit is less than the threshold time-rate discharge. The absence of the fault in the passive discharge element 142 can be detected when the time-rate discharge of the high-voltage electrical circuit is at least the threshold time-rate discharge.

Alternatively, diagnosis may be made through a determination of the elapsed time period it takes the voltage across the high-voltage electrical circuit to discharge from the first voltage to a predetermined second voltage and comparison to a maximum permissible elapsed time period (i.e., threshold elapsed time period). A fault may be detected in the passive discharge element when the elapsed time period is greater than the maximum permissible elapsed time period.

Figure 4:
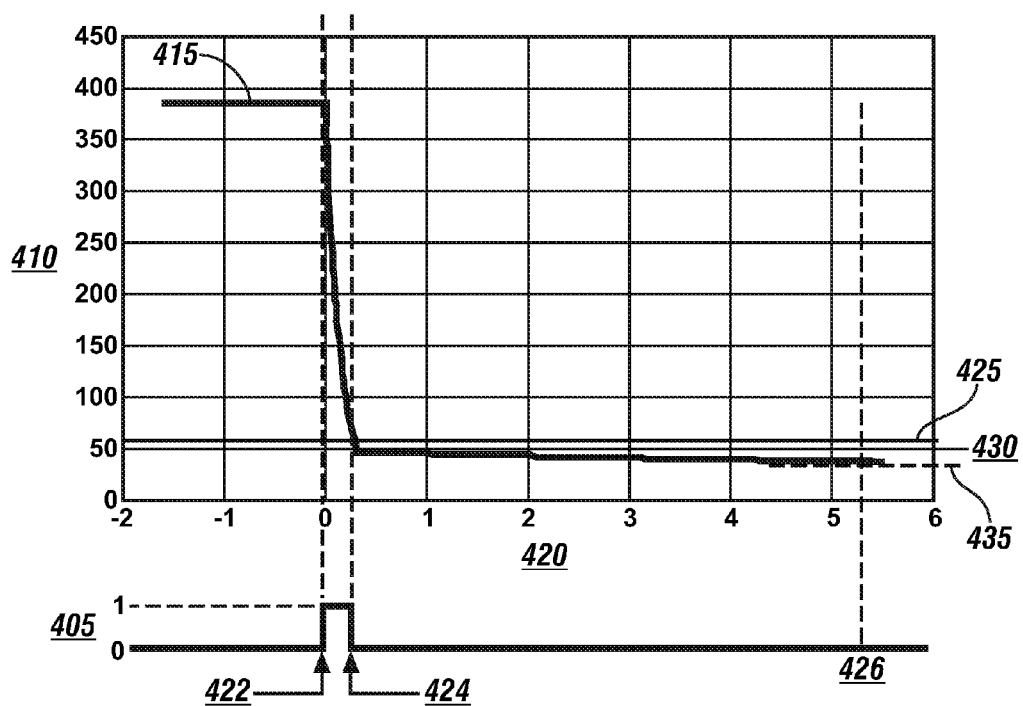
FIG. 4 illustrates voltage and a discrete active discharge command in relation to elapsed time, with depicted data including voltage across a high-voltage electrical circuit and an active discharge command prior to, during, and subsequent to an active voltage discharge event, in accordance with the disclosure.

FIG. 4 graphically shows voltage and a discrete active discharge command 405 on the y-axis 410 and time on the x-axis 420. Depicted data includes the voltage 415 across a high-voltage electrical circuit and the active discharge command 405 prior to, during, and subsequent to an active voltage discharge event. Initially, the voltage 415 across the high-voltage electrical circuit is at a relatively high voltage of almost 400 V DC and the active discharge command 405 is 0, indicating deactivation of the controllable discharge switch 146. At time 422 the active discharge command 405 shifts to 1, indicating the command to initiate active discharge of the high-voltage electrical circuit (i.e. activation of the controllable discharge switch 146). At time 424 the voltage 415 across the high-voltage electrical circuit is less than a target voltage 425 of substantially 60V DC as shown. The active discharge command 405 shifts to 0 in response, thus indicating a command to discontinue the active discharge of the high-voltage electrical circuit. The voltage 415 across the high-voltage electrical circuit is monitored and recorded as first voltage 430. A timer is initiated, and time 426 indicates a preset elapsed time period of 5 seconds. At time 426, the voltage 415 across the high-voltage electrical circuit is measured and recorded as second voltage 435. The difference between the first voltage 430 and the second voltage 435 is calculated and recorded, and is compared to a threshold voltage change. Actions in accordance with the control scheme 300 described with reference to FIG. 3 are executed based upon the comparison of the difference between the first voltage 430 and the second voltage 435 and the threshold voltage change, including indicating presence or absence of a fault in the passive discharge circuit.

The control scheme 300 permits regular diagnostic monitoring of the passive discharge circuit, e.g., passive discharge element 142 of discharge circuit 140, without employing additional sensors or circuitry and without affecting elapsed time for discharging the high-voltage electrical circuit to a target voltage in response to a command to execute active discharge of the high-voltage electrical circuit.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A high-voltage discharge circuit diagnostic system, comprising:
   a high voltage DC link including a positive DC link and a negative DC link;
   a first resistor selectably connectable between the positive DC link and the negative DC link;
   a second resistor connected between the positive DC link and the negative DC link;
   a control module that connects the first resistor between the positive DC link and the negative DC link until the high voltage DC link discharges to a first voltage, after which the control module disconnects the first resistor from between the positive DC link and the negative DC link to permit continued discharge of the high voltage DC link through the second resistor to a second voltage through an elapsed time period, whereafter the control module diagnoses a fault in the second resistor based upon the first voltage, the second voltage, and the elapsed time period.

2. The system as claimed in claim 1, wherein the elapsed time period is predetermined and the control module diagnoses the fault in the second resistor through comparison of the difference between the first voltage and the second voltage to a predetermined threshold voltage change.

3. The system as claimed in claim 1, wherein the elapsed time period is predetermined and the control module diagnoses the fault in the second resistor through comparison of a time-rate discharge based upon the first voltage, the second voltage, and the predetermined elapsed time period to a predetermined threshold time-rate discharge.

4. The system as claimed in claim 1, wherein the second voltage is predetermined and the control module diagnoses the fault in the second resistor through comparison of a time-rate discharge based upon the first voltage, the predetermined second voltage, and the elapsed time period to a predetermined threshold time-rate discharge.

5. The system as claimed in claim 1, wherein the second voltage is predetermined and the control module diagnoses the fault in the second resistor through comparison of the elapsed time period to a predetermined threshold elapsed time period.

6. The system as claimed in claim 1, wherein the second resistor has a resistance at least two orders of magnitude greater than the resistance of the first resistor.

7. A method for diagnosing a fault in a passive discharge element connected between a positive DC link and a negative DC link, comprising:

monitoring voltage across the positive and negative DC links;

connecting an active discharge element between the positive and negative DC links until the voltage across the positive and negative DC links discharges to a first voltage, whereafter the active discharge element is disconnected from between the positive and negative DC links;

permitting the positive DC link to continue discharging to the negative DC link through the passive discharge element to a second voltage through an elapsed time period;

detecting a fault in the passive discharge element based upon the first voltage, the second voltage, and the elapsed time period.

8. The method as claimed in claim 7, wherein the elapsed time period is predetermined and detecting the fault in the passive discharge element is through comparison of the difference between the first voltage and the second voltage to a predetermined threshold voltage change.

9. The method as claimed in claim 7, wherein the elapsed time period is predetermined and detecting the fault in the passive discharge element is through comparison of a time-rate discharge based upon the first voltage, the second voltage, and the predetermined elapsed time period to a predetermined threshold time-rate discharge.

10. The method as claimed in claim 7, wherein the second voltage is predetermined and detecting the fault in the passive discharge element is through comparison of a time-rate discharge based upon the first voltage, the predetermined second voltage, and the elapsed time period to a predetermined threshold time-rate discharge.

11. The method as claimed in claim 7, wherein the second voltage is predetermined and detecting the fault in the passive discharge element is through comparison of the elapsed time period to a predetermined threshold elapsed time period.

\* \* \* \* \*